United States Patent [19]

Hubert et al.

[11] 4,411,923

[45] Oct. 25, 1983

[54] PROCESS FOR THE EXTRACTION OF CAFFEINE FROM SUPER-CRITICAL SOLUTIONS

[75] Inventors: Peter Hubert; Otto Vitzthum, both of Bremen, Fed. Rep. of Germany

[73] Assignee: HAG Aktiengesellschaft, Fed. Rep. of Germany

[21] Appl. No.: 234,071

[22] Filed: Feb. 9, 1981

Related U.S. Application Data

[63] Continuation of Ser. No. 824,128, Aug. 12, 1977, abandoned.

[30] Foreign Application Priority Data

Aug. 18, 1976 [DE] Fed. Rep. of Germany ....... 2637197

[51] Int. Cl.³ ........................... A23F 3/36; A23F 5/20
[52] U.S. Cl. .................................. 426/271; 426/427; 426/478; 426/481
[58] Field of Search ............... 426/271, 318, 319, 427, 426/478, 481

[56] References Cited

U.S. PATENT DOCUMENTS

| | | | |
|---|---|---|---|
| 3,108,876 | 10/1963 | Turken et al. | 426/271 |
| 3,806,619 | 4/1974 | Zosel | 426/478 |
| 3,843,824 | 10/1974 | Roseluis et al. | 426/478 X |
| 4,031,251 | 6/1977 | Margolis et al. | 426/427 |

*Primary Examiner*—Joseph M. Golian
*Attorney, Agent, or Firm*—Pollock, Vande Sande & Priddy

[57] ABSTRACT

A process for extracting caffeine from raw coffee, roast coffee, tea and the like. Super-critical carbon dioxide is used as extracting agent, and ion-exchangers are used to absorb the caffeine, and are subsequently regenerated by use of aqueous regenerating agents.

7 Claims, 1 Drawing Figure

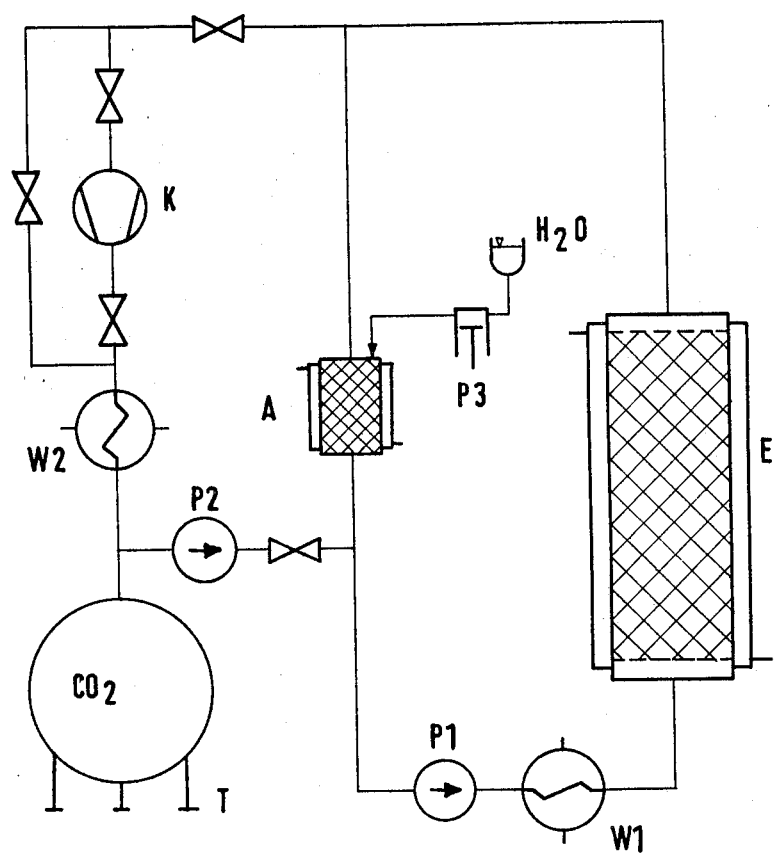

PROCESS FOR THE EXTRACTION OF CAFFEINE FROM SUPER-CRITICAL SOLUTIONS

This is a continuation of application Ser. No. 824,128 filed Aug. 12, 1977, and now abandoned.

BACKGROUND OF THE INVENTION

Successful attempts since the beginning of this century to remove caffeine from coffee on account of its physiological effects have resulted in a relatively large number of processes which aim in various ways to reduce the concentration of this alkaloid not only in coffee but also in tea. These are generally extraction processes in which the material, moistened with water or steam, is treated with organic solvents which selectively remove the caffeine. The isolation of the caffeine and the recovery of the solvent is then effected by distillation.

The problems associated with the solvent contact, i.e., contamination of the extracted material, have recently been overcome by decaffeinating processes using carbon dioxide as a physiologically tolerable extracting agent. In accordance with the teaching of German Patent No. 2,005,293, caffeine is removed from raw coffee with moist, super-critical $CO_2$, and after liquefying the $CO_2$ current the caffeine is removed by adsorption onto activated carbon. According to German Pat. No. 2,212,281, in which the caffeine extraction from raw coffee is effected with liquid $CO_2$, the caffeine adsorption is also carried out preferably with activated carbon. In German Pat. No. 2,119,678, the removal of caffeine is effected from ground roast coffee; first the aroma oil is removed from the coffee with super-critical dry $CO_2$, and then, after moistening, the caffeine is removed. The separation of the caffeine from the gas current is effected, besides adsorption with activated carbon or kieselguhr, by reducing the pressure or altering the temperature. A similar process for tea is described in German Pat. No. 2,127,642. In this case, too, after previous aroma removal, decaffeination of the moist tea is carried out with super-critical $CO_2$ and the caffeine is separated by reducing the pressure or changing the temperature of the gas.

In the two first-mentioned processes according to German Pat. Nos. 2,005,293 and 2,212,281, the activated carbon used for the caffeine adsorption must be regenerated. Regeneration of the carbon, which involves on the one hand removal of the caffeine and in particular of the caffeine residues, and on the other hand the reactivation of the adsorption agent, is a very expensive process since the adsorption bond between the carbon and the caffeine is very strong. When using activated carbon in the known processes, i.e., both in the case of a pressure change in the $CO_2$ system (pumping up to operating pressure, blowing off the $CO_2$) and in the case of regeneration, there is unavoidable dust formation and particle disintegration in the structure of the activated carbon, as a result of which fines are produced. Re-use of the carbon material extremely limited, which restricts the economy of the process. A further disadvantage of activated carbon is its inadequate selectivity for caffeine, because other constituents of the coffee are also adsorbed, which, especially in view of the sensory properties of the caffeine-free product obtained, can be a disadvantage. Other methods of separating the caffeine from the gas current require changes of pressure and temperature which are unfavorable as regards energy consumption; for example, the pressure of the caffeine-containing gas current must be reduced considerably to achieve separation.

SUMMARY OF THE INVENTION

The object of the present invention is to overcome the disadvantages of the known processes. The starting point was the discovery that the regeneration of a caffeine adsorbing agent with an aqueous phase is preferred because of the risk of contamination of the extracted material associated with any method of regeneration using organic solvents. Furthermore, a phase change should not be necessary for the caffeine adsorption, i.e., isobaric and isothermal conditions are sought for the simultaneous extraction and adsorption of caffeine.

It has now surprisingly been found that ion-exchangers are well suited to the adsorption of caffeine from a super-critical gas phase of a $CO_2$ medium which is under high pressure and may also be moist. This was the more unexpected since, for example, cation exchangers charged with ammonium ions are regenerated with gaseous carbonic acid in the presence of water vapor (see German Patent Application No. 0 2123 IVa/12k, 1952), and the more weakly basic caffeine should be a more readily regeneratable ammonium analogue. In addition, ion exchangers charged with other ions are regenerated cheaply using carbon dioxide in the aqueous phase [see Chem. Ing. Techn. 47, Book 14, 613 (1975)]. It was furthermore found that the adsorption of caffeine by ion exchangers is considerably more selective than is the case with activated carbon; thus, for example, other $CO_2$-soluble constituents, such as fat constituents, are co-bonded in a very much lower quantity.

The regeneration of the caffeine-charged exchanger compositions can be effected in known manner with aqueous salt solutions or aqueous mineral acids. The regeneration can also be carried out using aqueous alkali metal or ammonium hydroxide solutions, so that the exchanger is then completely charged with cations (for example, $K^+$, $Na^+$, $Ca^{++}$, $NH_4^+$) and the caffeine is freed by displacement. In this case, it will be appreciated that the exchanger must subsequently be converted by mineral acids into the $H^+$ form.

The aqueous, caffeine-containing regenerant solutions can be extracted in a manner known per se, e.g., by reverse osmosis or by concentration, or by countercurrent extraction with water-insoluble solvents, and the caffeine is obtained by evaporating the solvent.

BRIEF DESCRIPTION OF THE DRAWING

The drawing is a schematic flow chart of the process of the present invention, as described hereinbelow.

DESCRIPTIONS OF THE PREFERRED EMBODIMENTS

Synthetic resin exchangers of the same purity as used for the preparation of drinking water are particularly suitable for the process of the invention. Such exchangers have proved pressure-resistant. For example, a preferred form of the present process uses strongly acidic cation exchangers with $SO_3H$ groups as anchor groups. In this case the procedure is as follows (referring to the acccompanying drawing):

The exchanger is flushed into the adsorption container A and the water is allowed to flow off. The extraction material, previously moistened with water or steam, is in the extraction container E. $CO_2$, for example in liquid form, is then pumped, by pump P2, out of the tank T and into the plant. Subsequently the circulation via W1, E and A is commenced by switching on the circulating pump P1, and the $CO_2$ is brought to the desired operating temperature by heating in the heat exchanger W1. The quantity of $CO_2$ introduced previously is such that on reaching the operating temperature the desired operating pressure is also established. Another possible way of filling the plant with $CO_2$ consists of feeding it into the circulation in the super-critical state from the beginning, by means of pump P2, until the desired operating pressure is reached. In this case, the extracting agent is already stored in the super-critical state in the supply tank, and the purpose of the heat exchanger W1 is then only to maintain the operating temperature of the gas circulated by the pump P1.

The circulation is carried out isobarically and isothermally until the desired residual caffeine contents in the extracting agent are achieved. The adjusted temperatures are in the range between a value just above the critical temperature of the $CO_2$ and approximately 150° C., preferably between 60° and 80° C., and the pressure is preferably between 100 and 300 bars.

The moist and for the most part spherical particles of exchanger are flexibly deformable and slightly change in volume with the pressure in the $CO_2$ system. It is therefore possible to talk of a "breathing activity".

Since the circulating super-critical $CO_2$ has a certain capacity to absorb water, there may be a partial reduction of the water content of a few types of exchanger and consequent relative hardening of the exchanger particles as result of water desorption. This effect may result in a reduction of the "breathing activity", so that when the gas is blown off at the end of the process, if the exchanger composition also has to be removed, the gas-filled micropores may have a bursting effect. In order safely to avoid explosion of the particles during and after release of the gas, after stopping the gas circulation (i.e., at the end of caffeine adsorption) a quantity of water is forced by means of the pump P3 into the exchanger charge in A still standing under $CO_2$ pressure. The quantity of water is between 5 and 30% of the amount of exchanger, depending on the type of exchanger, and is such that the adsorbed water fully restores the breathing activity or flexibility. Subsequently the recovery of the $CO_2$ from circulation is effected by first liquefying the gas in the heat exchanger W2 acting as cooler and, when a pressure balance has been reached between the gas in circulation and the tank, compressor K pumps the rest of the gas out of the cycle. The extracted material is dried in a manner known per se after removal from E, and the ion exchanger is regenerated. The resulting eluates should advantageously have a maximal concentration of caffeine. It has been shown that regeneration at 80° to 90° C. produces particularly favorable results. This has the further advantage that the exchanger composition from the process having a temperature of 80° C. is regenerated at approximately the same temperature, and consequently there is no thermal shock which might damage the exchanger particles.

To recover the caffeine, the aqueous regenerant solutions are either concentrated directly until the caffeine crystalizes out, or are subjected to a liquid-liquid countercurrent extraction, wherein water-insoluble caffeine solvents, such as, for example, methylene chloride, benzene, toluene, etc., are used. The caffeine obtained has a purity of >99%. The regenerant solutions freed from caffeine may be used again as regenerating agents.

The following examples illustrate the invention:

EXAMPLE 1

2.5 kg of moistened raw coffee were decaffeinated in an apparatus as shown in the accompanying drawing for 12 hours with super-critical $CO_2$ at 60° C. and 190 bar. 200 ml of a strongly acidic cation exchanger were used (matrix: styrene cross linked with divinylbenzene, anchor groups: $-SO_3H$).

At the end of the caffeine removal, 30 ml of water were forced into the exchanger charge, which was still under pressure, and after a brief moistening period the gas was released from the circulation. The raw coffee was dried to an 11% water content and had a residual caffeine content of 0.04% (initial value: 1.21% before moistening). To displace the caffeine the ion exchanger was rinsed in a column with 500 ml of a 25% ammonia solution at 45° C. The eluate was percolated with methylene chloride, and after evaporating the methylene chloride, a caffeine quantity of 20.8 g was found. The exchanger charged with ammonium ions was converted into the $H^+$ form with aqueous hydrochloric acid.

EXAMPLE 2

3 kg of ground roast coffee, from which the aroma oil had previously been removed in a manner known per se with dry super-critical $CO_2$, was moistened and decaffeinated in an apparatus as shown in the accompanying drawing for 8 hours with $CO_2$ at 50° C. and 200 bar. 250 ml of a medium-strength acidic ion exchanger were used (matrix: condensation product of phenol and formaldehyde, anchor groups: chain-standing phosphonic acid groups).

Once the caffeine removal was complete, 40 ml of water were forced into the exchanger charge which was still under pressure, and the cycle was emptied after a brief moistening time.

The moist roast coffee can then be used directly for recovering an aqueous extract and does not have to be dried beforehand. Its caffeine content was still 0.03% i.T. (=in dry composition). The initial value was about 1.15% of caffeine.

For regeneration, the ion exchanger was rinsed in a heatable column with 800 ml of a 10% calcium chloride solution. After percolating the eluate with methylene chloride which was then evaporated, 33.3 g of caffeine were obtained.

The exchanger charged with $Ca^{++}$ ions was converted into the $H^+$ from with aqueous hydrochloric acid.

EXAMPLE 3

1 kg of a customary commercial tea mixture, from which the aroma had previously been removed in a manner known per se with dry $CO_2$, was moistened and decaffeinated in an apparatus as shown in the accompanying drawing for 3 hours with super-critical $CO_2$ at 40° C. and 200 bar. 300 ml of a strongly acidic ion exchanger were used. Before removing the exchanger from the cycle, 45 ml of water were forced into it, while still under $CO_2$ pressure, for the purpose of moistening, and subsequently the cycle was emptied. After drying to 7.5% moisture content, the tea had a residual caffeine content of 0.05% (starting value before moistening: 3.1%).

For regeneration, the ion exchanger was rinsed in a column with 600 ml of 20% hydrochloric acid at 90° C. and subsequently rinsed neutral with distilled water. The eluate was percolated with methylene chloride, and after removing the methylene chloride a caffeine quantity of 30.1 g was found.

What is claimed is:

1. Process for extracting caffeine from caffeine-containing natural substances using super-critical carbon dioxide as extracting agent wherein caffeine and non-caffeine substances are removed from said natural substances by the extracting agent, including the steps of
    (a) selectively removing caffeine from the extracting agent with a polystyrene-based cation exchanger with sulfonic acid groups at a pressure between 100 to 300 bars;
    (b) adding from 5% to 30% water based on the total weight of the cation exchange resin to moisten the caffeine-filled resin and thereby avoid explosion of the resin particles during and after release of the $CO_2$ gas; and
    (c) regenerating said cation exchange resin by use of aqueous regenerating agents.

2. Process according to claim 1, wherein the caffeine adsorption in the $CO_2$-system by the cation exchangers is effected at temperatures different from those used for the extraction.

3. Process according to claim 1, wherein the natural substances are selected from the group comprising raw coffee, roast coffee and tea.

4. Process according to claim 1, wherein the regeneration of the cation exchangers is effected with aqueous salt solutions at temperatures between 20° and 100° C.

5. Process according to claim 1, wherein the regeneration of the cation exchangers is effected with aqueous mineral acids at temperatures between 20° and 100° C.

6. Process according to claim 5, wherein the regeneration is effected at temperatures between 80° and 90° C.

7. Process according to claim 1, wherein the regeneration of the cation exchangers is carried out by displacing the caffeine by
    (a) aqueous alkali metal or ammonia solutions; and
    (b) subsequent conversion of the exchangers into the $H^+$ form.

* * * * *